United States Patent [19]

Schmitz

[11] 4,279,825
[45] Jul. 21, 1981

[54] PROCESS FOR THE PREPARATION OF 1,4-DIAMINOANTHRAQUINONE-2,3-DISULPHONIC ACID

[75] Inventor: Reinold Schmitz, Odenthal, Fed. Rep. of Germany

[73] Assignee: Bayer Aktiengesellschaft, Leverkusen, Fed. Rep. of Germany

[21] Appl. No.: 83,131

[22] Filed: Oct. 9, 1979

[30] Foreign Application Priority Data

Oct. 26, 1978 [DE] Fed. Rep. of Germany ....... 2846622

[51] Int. Cl.$^3$ .......................................... C07L 143/665
[52] U.S. Cl. ..................................... 260/371; 260/377
[58] Field of Search ................................ 260/371, 377

[56] References Cited

U.S. PATENT DOCUMENTS

| | | | |
|---|---|---|---|
| 1,975,386 | 10/1934 | Baumann | 260/371 |
| 2,008,056 | 8/1935 | Baumann | 260/371 |
| 2,025,370 | 12/1935 | Baumann | 260/371 |
| 2,628,963 | 2/1953 | Laucius et al. | 260/377 |

OTHER PUBLICATIONS

*Chemical Abstract* vol. 40, #32456, Noboru et al., "1,4,Diamino-2,3-dicyanoanthraquinone", 1975.

*Primary Examiner*—Patrick Garvin
*Assistant Examiner*—Raymond K. Covington
*Attorney, Agent, or Firm*—Sprung, Felfe, Horn, Lynch & Kramer

[57] ABSTRACT

1,4-Diaminoanthraquinone-2,3-disulphonic acid, which is a valuable dyestuff intermediate product, is obtained in a simple manner when 1,4-diamino-2,3-dichloroanthraquinone is reacted by itself with boric acid, that is to say without the condensation agents which are otherwise customary, such as phenol, sulphuric acid or acetic anhydride, and the reaction product is treated with alkali metal sulphites in a known manner.

The new process is more economical and pollutes the environment to a lesser extent than the processes known hitherto.

5 Claims, No Drawings

PROCESS FOR THE PREPARATION OF 1,4-DIAMINOANTHRAQUINONE-2,3-DISULPHONIC ACID

The invention relates to a new improved process for the preparation of 1,4-diaminoanthraquinone-2,3-disulphonic acid, which is a valuable intermediate product in the production of 1,4-diaminoanthraquinone-2,3-dinitrile and dyestuffs derived from this compound (compare, for example, U.S. Pat. No. 2,628,963).

1,4-Diaminoanthraquinone-2,3-disulphonic acid was hitherto generally prepared by reacting 1,4-diamino-2,3-dichloroanthraquinone (hereinafter called "dichloroanthraquinone") with boric acid in the presence of a condensation agent, such as sulphuric acid, acetic anhydride or phenol, and then treating the "boric acid ester" thereby formed with alkali metal sulphites (compare German Patent Specification No. 579,323).

However, in this method of preparation, the effluent is very severely polluted by the condensation agents, which are employed in relatively large amounts and furthermore are highly corrosive and/or—as in the case of phenol—are very toxic.

It has now been found that the title compound can be prepared in a simple manner, and with the abovementioned effluent problems reduced, if 1,4-diamino-2,3-dichloroanthraquinone is reacted with boric acid or boric anhydride without also using other condensation agent and the reaction product is treated with alkali metal sulphites in a manner which is in itself known.

Within the scope of this invention, by "boric acid" there is understood metaboric acid $HBO_2$, in addition to the usual orthoboric acid $H_3BO_3$.

The reaction of dichloroanthraquinone with boric acid or boric anhydride takes place at 120° to 220° C. and is appropriately carried out in the presence of about 2 to 10 times the amount of an organic solvent which is inert under the reaction conditions, such as nitrobenzene or trichlorobenzene. The amount of boric acid can also vary within relatively wide limits. However, the minimum amount should be 2 mols. A maximum amount of 10 mols of boric acid is generally sufficient. It is particularly preferable to use 6 to 8 mols of boric acid. (All the above statements with regard to amounts relate to the dichloroanthraquinone employed).

The reaction of dichloroanthraquinone with boric acid or boric anhydride can be carried out in the usual reaction vessels. However, it is particularly economical to react the components in a suitable drier, for example a paddle drier, and thereby to evaporate off water liberated or any organic solvent present, if necessary under reduced pressure. The reaction product can be introduced into hot aqueous alkali metal sulphite solution without further working up, 1,4-diaminoanthraquinone-2,3-disulphonic acid being formed almost quantitatively.

It is not necessary to isolate the sulphonic acid as such from the reaction medium for subsequent reaction of the disulphodnic acid with alkali metal cyanide to give the corresponding dinitrile (compare German Patent Specification No. 935,665).

The present invention thus furthermore relates to a one-pot process for the preparation of 1,4-diaminoanthraquinone-2,3-dinitrile, which is characterized in that a solution of the disulphonic acid such as is obtained directly in the process, according to the invention, for its preparation is reacted with the required amount of alkali metal cyanide, excess cyanide and sulphite are destroyed by adding hypochlorite solution and the dinitrile precipitated is isolated by filtration.

The two new processes are illustrated in more detail by the following example.

EXAMPLE 600 ml of nitrobenzene, 237.5 g of boric acid and 150 g of 1,4-diamino-2,3-dichloroanthraquinone (95% pure) are heated slowly to 145° C. in a three-necked flask with a descending condenser. From 120° C., a mixture of water and nitrobenzene starts to distil off. The temperature is then increased to 145° C. until most of the water has distilled off (about 1 hour). The temperature is now increased slowly to 205° C. The rest of the water and 250 ml of nitrobenzene are distilled off at this temperature (about 3 hours). The reaction mixture is then dried at 140° C. in a vacuum drying cabinet. Yield: 296 g.

60 g of this product are introduced into a solution, heated to 90° C., of 40 g of sodium sulphite in 500 ml of water in the course of 30 minutes. The resulting solution is then adjusted to pH 8 by adding 15 ml of 50% strength NaOH dropwise and is stirred at 95° C. for 2 hours. During this period, the colour of the solution changes from green to blue. The hot solution is then clarified over an asbestos filter, and a solution of 20 g of sodium cyanide in 100 ml of water is added dropwise at 80° C. The mixture is then stirred at 95° C. for 2 hours in order to bring the reaction to completion. It is cooled to 40° C. and about 285 ml of 13% strength hypochlorite solution are added dropwise, for the purpose of destroying excess sulphite and cyanide, until potassium iodide starch paper indicates a very slight excess of free chlorine. During this addition, the temperature rises to about 70° C. The mixture is filtered hot and the residue is washed with hot water until the runnings are neutral. After drying, 23.5 g (81.5% of theory) of 1,4-diaminoanthraquinone-2,3-dinitrile are obtained in a purity of 94% (determined photometrically).

I claim:

1. A process for the preparation of 1,4-diaminoanthraquinone-2,3-disulphonic acid consisting of reacting 1,4-diamino-2,3-dichloroanthraquinone with boric acid in the absence of any additional condensation agent, and treating the reaction product with an alkali metal sulphite.

2. A process according to claim 1, wherein the reaction is carried out in the presence of an organic solvent which is inert under the reaction conditions.

3. A process according to claim 2, wherein nitrobenzene is used as the solvent.

4. A process according to claim 1, wherein the reaction is carried out using 6 to 8 mols of boric acid or boric anhydride per mol of dichloroanthraquinone.

5. A process according to claim 1, wherein the reaction of dichloroanthraquinone with boric acid or boric anhydride is carried out in a drier in the presence of nitrobenzene and the solvent and the water liberated are evaporated off.

* * * * *